United States Patent
Fan

(10) Patent No.: US 9,912,829 B2
(45) Date of Patent: Mar. 6, 2018

(54) SYSTEM, APPARATUS AND METHOD TO PROCESS DOCUMENTS ACCORDING TO DOCUMENT PROCESSING PROFILE

(71) Applicant: Qinlei Fan, Frisco, TX (US)

(72) Inventor: Qinlei Fan, Frisco, TX (US)

(73) Assignee: RICOH COMPANY, LTD., Tokyo (JP)

(*) Notice: Subject to any disclaimer, the term of this patent is extended or adjusted under 35 U.S.C. 154(b) by 33 days.

(21) Appl. No.: 15/042,731

(22) Filed: Feb. 12, 2016

(65) Prior Publication Data

US 2017/0237871 A1    Aug. 17, 2017

(51) Int. Cl.
*H04N 1/00* (2006.01)
*H04N 1/04* (2006.01)

(52) U.S. Cl.
CPC ....... *H04N 1/0417* (2013.01); *H04N 1/00212* (2013.01); *H04N 1/00474* (2013.01); *H04N 1/00482* (2013.01); *H04N 1/00514* (2013.01)

(58) Field of Classification Search
None
See application file for complete search history.

(56) References Cited

U.S. PATENT DOCUMENTS

| | | | | |
|---|---|---|---|---|
| 2006/0195491 | A1* | 8/2006 | Nieland | G06F 17/30011 |
| 2010/0149577 | A1* | 6/2010 | Kamasuka | H04N 1/00222 |
| | | | | 358/1.13 |
| 2011/0063687 | A1* | 3/2011 | Inui | H04N 1/00214 |
| | | | | 358/442 |
| 2014/0093170 | A1* | 4/2014 | Ohguro | G06K 9/78 |
| | | | | 382/176 |

OTHER PUBLICATIONS

U.S. Appl. No. 14/735,251, Tom Haapanen et al., filed Jun. 10, 2015.
U.S. Appl. No. 14/965,401, Qinlei Fan et al., filed Dec. 10, 2015.

* cited by examiner

*Primary Examiner* — Barbara Reinier
(74) *Attorney, Agent, or Firm* — Cooper & Dunham LLP

(57) ABSTRACT

Tools (for example, system, apparatus, application software, a method, etc.) can be provided for processing scan images corresponding to a hardcopy document that has been scanned according to a document processing profile. For example, when such profile specifies a division size, the scan images corresponding to the scanned hardcopy document may be assembled into multiple divided image files (each no greater than the division size) and such multiple divided image files are sent to a specified scan image target as a grouping of divided image files associated with the hardcopy document.

17 Claims, 15 Drawing Sheets

Send to Email Options

User: John Smith

Divide Email — Size Divide ▽
- Do Not Divide
- Page Divide
- Size Divide

Email Division Size (KB)

Email Attachment Format

Notification   ○ Yes   ● No

Priority   Do Not Assign ▽

[ Ok ]                                    [ Cancel ]

Fig. 7G

Send to Email Summary

User: John Smith

Divide Email

Email Division Size    [Size Divide ▼]

Division Size (KB)    100 KB
                    50 KB

Image Input
- Image1.TIFF - 32 KB
- Image2.TIFF - 5 KB
- Image3.TIFF - 8 KB
- Image4.TIFF - 40 KB
- Image5.TIFF - 38 KB

Email Output

Email 1:
First Attached File: 20141231122020_0001.pdf - 45 KB
Second Attached File: 20141231122020_0002.pdf - 40 KB Email 2:
First Attached File: 20141231122020_0003.pdf - 38 KB

[Ok]   [Cancel]

Fig. 7H

SYSTEM, APPARATUS AND METHOD TO PROCESS DOCUMENTS ACCORDING TO DOCUMENT PROCESSING PROFILE

TECHNICAL FIELD

This disclosure relates to systems, apparatuses and methodologies for document processing, and more specifically, to such systems, apparatuses and methodologies configured to process scan document images according to a document processing profile.

BACKGROUND

In the current information age, information technology (IT) tools play a significant role in our daily activities, and there are often discussions of the desirableness of a paperless society. Information technology tools are typically employed as a means to improve efficiency in the workplace (as well as elsewhere). For example, scanners and multi-function peripherals (MFP) may be utilized to convert hardcopy documents into electronic form, thereby decreasing the need for physical storage space and at the same time allowing the information in the paper documents to be transmitted quickly and more readily.

In such circumstances, as well as others, an often-repeated process can be streamlined by employing workflow tools, such that the sequence of operations in the process may be automated, as much as possible. For example, document workflow software may be provided to specify a document workflow process for scan document delivery from MFP, such as in an enterprise environment. Such document workflow process may include, for example, (i) scan hardcopy document to obtain document image, (ii) convert document image to multi-page PDF file, (iii) apply watermark thereto, and (iv) send watermarked image(s) to document management server or email.

However, there may be a variety of reasons for a need to conform the output within certain requirements or limitations, such as file type or file size. For example, specific output targets (e.g., e-mail, document management system, etc.) may have size and format limitations. In such contexts (such as when sending legal document to a court or other governmental agency), non-conforming documents will not be acceptable and may even create a significant problem.

There is a need for provisions to facilitate (or even ensure) conformance in such circumstances, with requirements such as file size and file type.

SUMMARY

Various tools (for example, a system, application software, a process, etc.) can be provided for a scan document to be processed according to a document processing profile.

In an exemplary embodiment, such document processing profiles are set by an administrator and it is not necessary for the end user to know the specifics of such settings. Instead, the user merely needs to know the profile that corresponds to the target destination to which the scan images is to be transmitted.

For example, a graphical user interface (GUI) may be provided on an operational display of an image forming apparatus, to permit a user to select a particular document processing profile to be applied when scanned images of a hardcopy document are to be processed.

In an aspect of this disclosure, each profile includes a pre-configured division size and when the sum of the scan images of the document exceed the division size indicated by the selected profile, the scan images are sequentially divided into multiple image files, with a size of each divide image file being no greater than the pre-configured division size specified in the document processing profile. The multiple divided image files as a grouping associated with the hardcopy document are sent to the target destination (e.g., an e-mail address, a folder, a server, another device, etc.).

In another aspect, the GUI permits the user to select a profile from amongst plural document processing profiles that correspond to respective venues. Each document processing profile indicates a division size corresponding to a maximum file size limitation of the corresponding venue for which the document processing profile has been crafted.

In an example, when a file conversion module assembles the scan images one-by-one into an image file, it determines whether the next scan image, not yet assembled into the image file, would, if assembled into such image file, increase the file size of the image file to be greater than the pre-configured division size. If it is determined that the next scan document image would increase the file size of the image file to be greater than the pre-configured division size, the next scan document image is assembled into another image file. Thus, by creating a new image file, the system can ensure that the pre-configured division size corresponding to the document processing profile is not exceeded.

In another aspect, the GUI may be configured to permit user selection of options regarding e-mail division, and as an example, the user may be permitted to select or specify an email size divide option to limit an e-mail sent by the module to a size that is no greater than a specified email division size. When such email divide option is set and a sum of the file sizes of the group of divided image files associated with the hardcopy document exceeds the email division size, the send-to-email module divides the group of divided image files into multiple subgroups of image files, and then sends multiple emails with the respective subgroups as attachments thereto.

In another aspect, the GUI may permit user entry of metadata for the hardcopy document, and when such feature is available, the file conversion module generates file names in which, for each file amongst the divided image files associated with the hardcopy document, the file name includes (i) a shared name portion associated with the hardcopy document constituted by specified metadata and associated with the hardcopy document, and (ii) a suffix portion unique to the file and appended to the shared name portion. Thus, identification by the user of particular divided files after such files are sent to the specified scan image target is more convenient.

In another aspect, the file conversion module may assemble each of the divided image files to a file type (such as a PDF file, PDF/A file, etc.) specified by the selected document processing profile.

BRIEF DESCRIPTION OF THE DRAWINGS

The aforementioned and other aspects, features and advantages can be more readily understood from the following detailed description with reference to the accompanying drawings wherein:

FIGS. 7A-7H show examples of graphical user interface screens that can be provided by an operational display of an image forming apparatus (e.g., in any of the systems shown in FIGS. 1, 2A, 2B and 2C).

DETAILED DESCRIPTION

Figure 1:
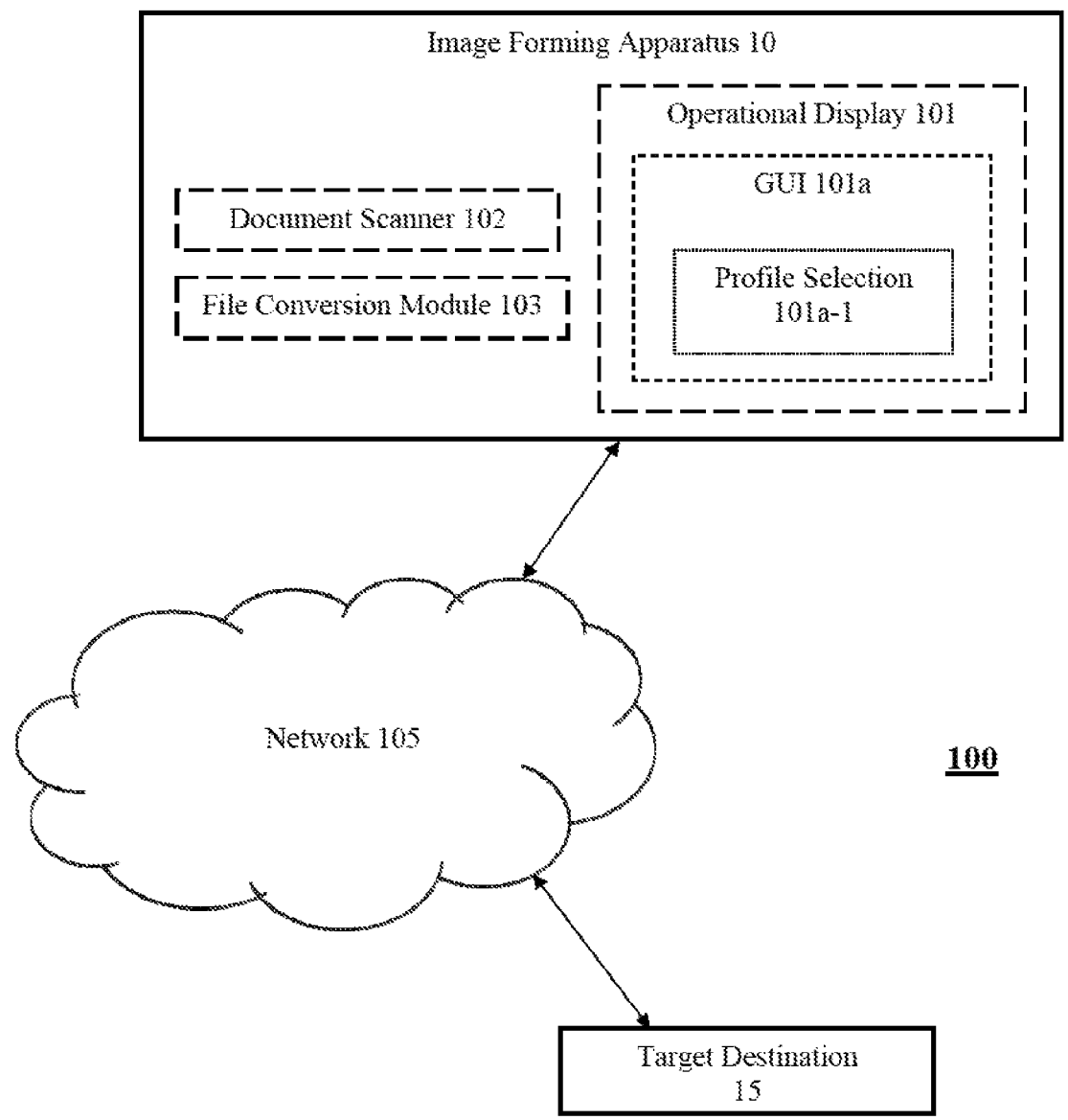
FIG. 1 shows a block diagram of a document processing system, according to an exemplary embodiment.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations will be omitted when it may obscure the subject matter of the present invention.

Various tools are discussed herein to facilitate processing of scan images according to a document processing profile. It should be appreciated by those skilled in the art that any one or more of such tools may be embodied in software and/or in any of various other ways and thus while various examples are discussed herein, the inventive subject matter of this disclosure is not limited to such examples described herein.

Referring now to the drawings, wherein like reference numerals designate identical or corresponding parts throughout the several views, FIG. 1 shows schematically a system 100 in which image forming apparatus 10 includes operational display 101, document scanner 102, and a file conversion module 103, and the image forming apparatus 20C is configured to send files to (and communicate with) target destination 15 via network 105.

The image forming apparatus 10 is configured to provide on the operational display 101 a graphical user interface (GUI) 101a which may include a profile selection GUI portion 101a-1, to permit a user to select a document processing profile. The profile selection GUI portion 101a-1 may display plural document processing profiles that each specify a file size limit for a scanned document image. For example, each document processing profile may indicate a size at which division of a file may occur which may correspond to a maximum size limitation of a particular venue. Such venue may be a particular legal court, and a list of courts and the corresponding size limits for documents for each court can be imported into the system via a local .CSV file or manually entered by a user (e.g., an administrator). The size of each file that the scanned data will be divided into may also be entered as a metadata field or a number. For example, the file size for a selected filing court may be looked up and saved to a 'DivisionSize' metadata field so that the appropriate file size will automatically be used for a particular court, as shown in FIG. 7D. Alternatively, if a selected profile does not match any saved entry, a user may specify the desired file size limit. It should be noted that the user is not necessarily forced to select from a set of available profiles. Instead, the user may proceed with processing the document using default size limitation values.

Figure 5:
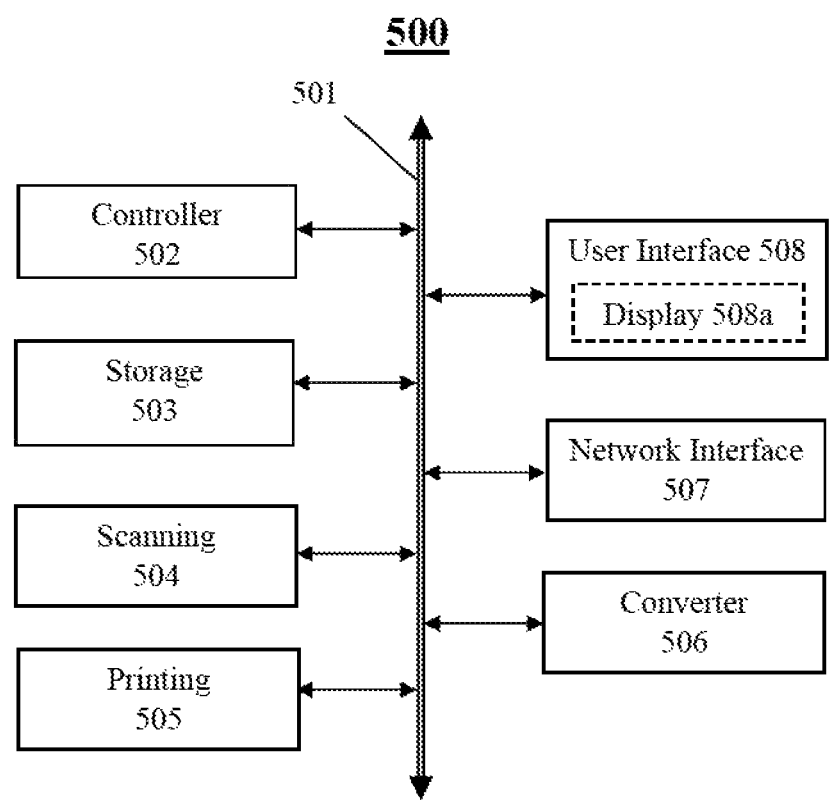
FIG. 5 shows a block diagram of an exemplary configuration of a multi-function image forming apparatus (e.g., in any of the systems shown in FIGS. 1, 2A, 2B and 2C)

The image forming apparatus 10 may have the ability to communicate with other devices connected to the network 105 via a network (or communication) interface (e.g., 506 in FIG. 5). Such communication may entail sending scanned document images to have processing performed by other devices connected to the network 105. Further, the document scanner 102 may also include storage capabilities thereby allowing document scanner 102 to store document processing profiles received via the network 105.

In an exemplary embodiment, the image forming apparatus 10 may be a multi-function device (such as 500 shown in FIG. 5, as discussed infra). The term "MFP" is used herein generically to include any multi-function image forming (or output) device having a scanning functionality, in addition to one or more other functionalities (e.g., printing or plotting, copy, fax, scan-to-email, scan-to-store, etc.). While the example in FIG. 1 refers, in the interest of brevity, to a single image forming apparatus 10, it should be appreciated that the network environment can have an arbitrary number of image forming devices.

The document scanner 102 scans, via a scanning function, physical (i.e. hardcopy) documents to generate one or more scanned document images that can be processed by the image forming apparatus 10 or a target destination 15 or another computing device (e.g., document processing apparatus 25 in FIG. 2A or computing device 300 in FIG. 3) according to the document processing profile selected by the user of the operational display 101. In an example, a user of the document scanner 102 may perform scanning by inputting hardcopy documents via a glass platen or an automatic document feeder (ADF).

The file conversion module 103 is configured to perform processing or further processing on one or more scanned document images received from the document scanner 102. Such processing by the file conversion module 103 is based on the document processing profile selected by the user. More specifically, the file conversion module 103 assembles the scan document images sequentially into divided image files, in which each divided image file has a file size no greater than the pre-configured division size specified by the document processing profile. After the processing of the scan document images is complete, the multiple divided image files as a grouping of the divided image files associated with the hardcopy document are sent to a specified image target.

The file conversion module 103 may assemble the scan document images one-by-one into an image file. In a case that the file conversion module 103 determines that the next scan document image that has not yet been assembled into the image file would, if assembled into the image file, increase the file size of the image file to be greater than the size specified in the document processing profile, the next scan document image may be assembled into another image file, rather than the current image file.

The file type of each of the scan document images may also be specified by the selected document processing profile. For example, the file type could be that of a conventional PDF or a PDF/A type file. The PDF file may be created as searchable and password-protected in a case where the PDF is selected as the file type. A PDF/A file is an ISO-standardized version of the Portable Document Format (PDF), also known as a "PDF for Archive." The PDF/A is an electronic document file format that is utilized for long-term preservation purposes, and as such may prohibit features such as font linking and other dynamic features that are not appropriate for long-term archiving.

Figure 7A:
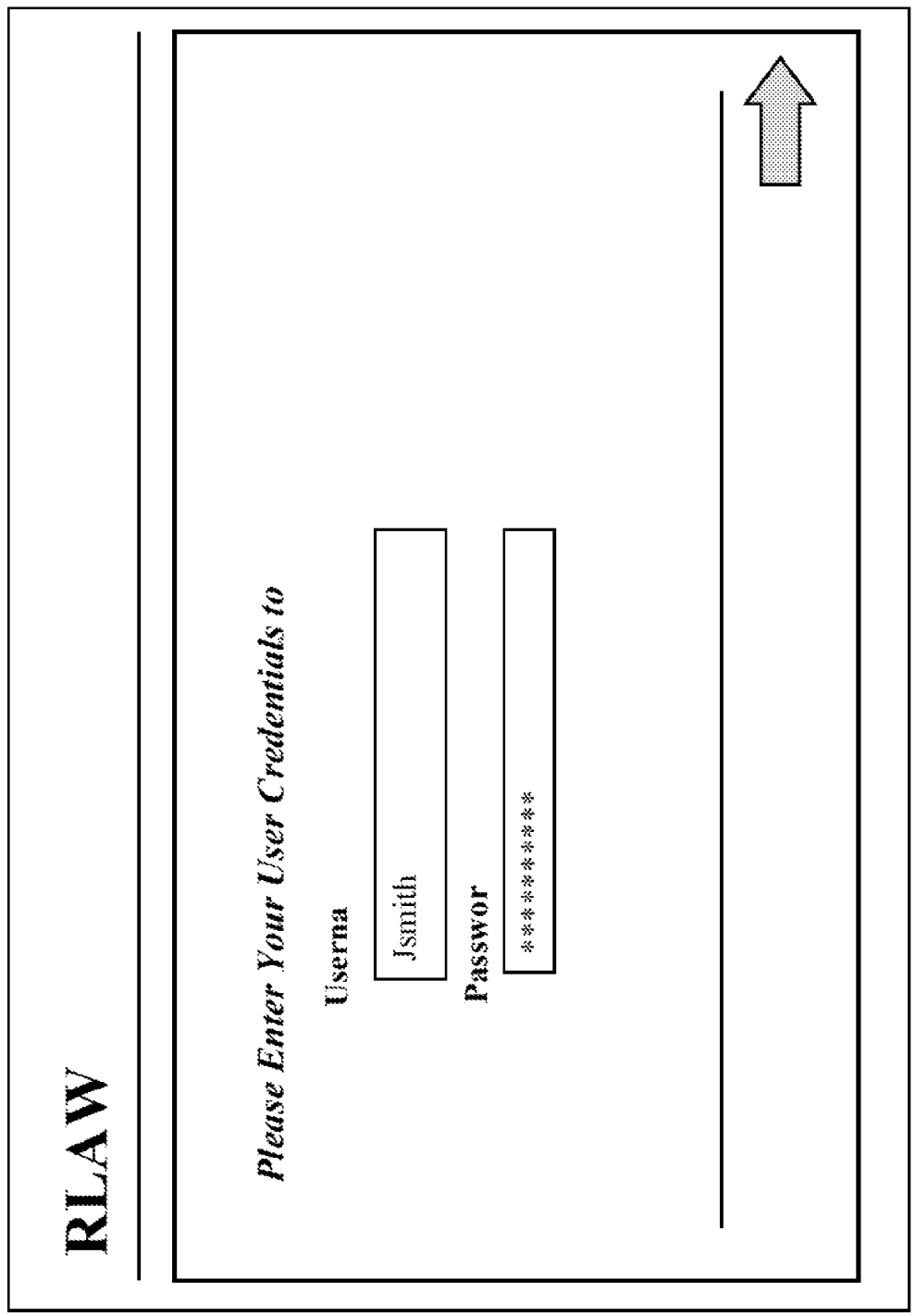
Figure 7B:
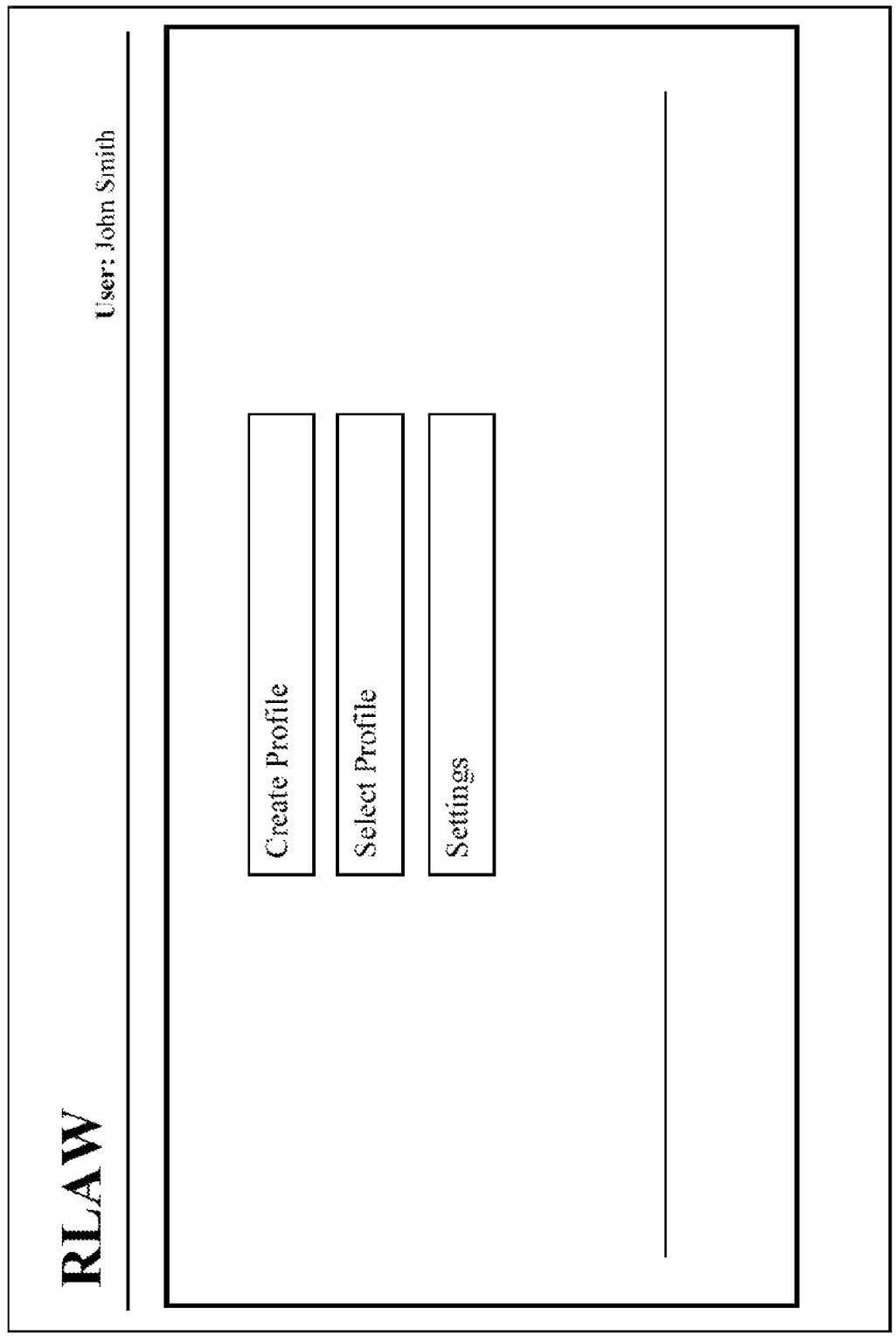
Figure 7C:
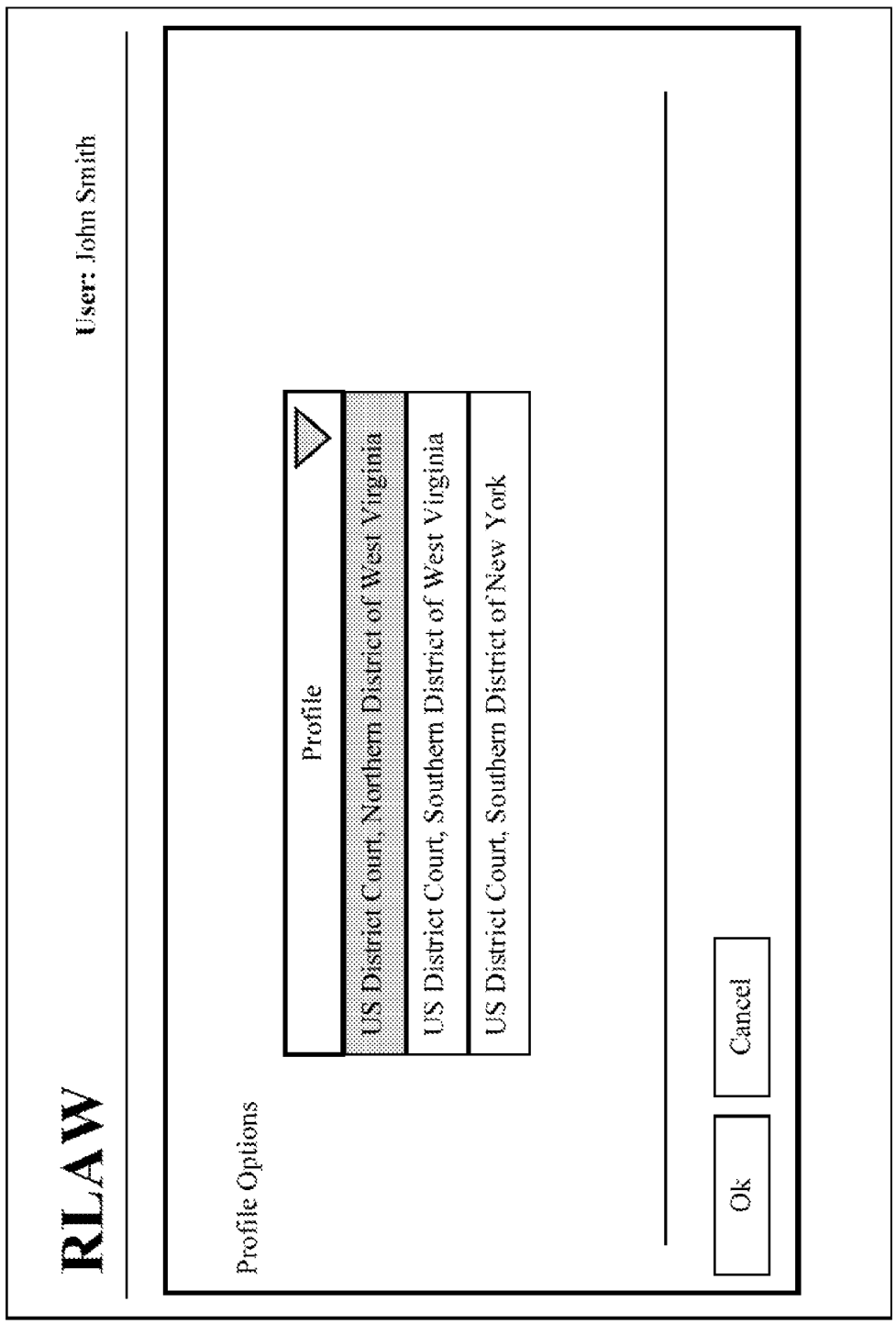
Figure 7D:
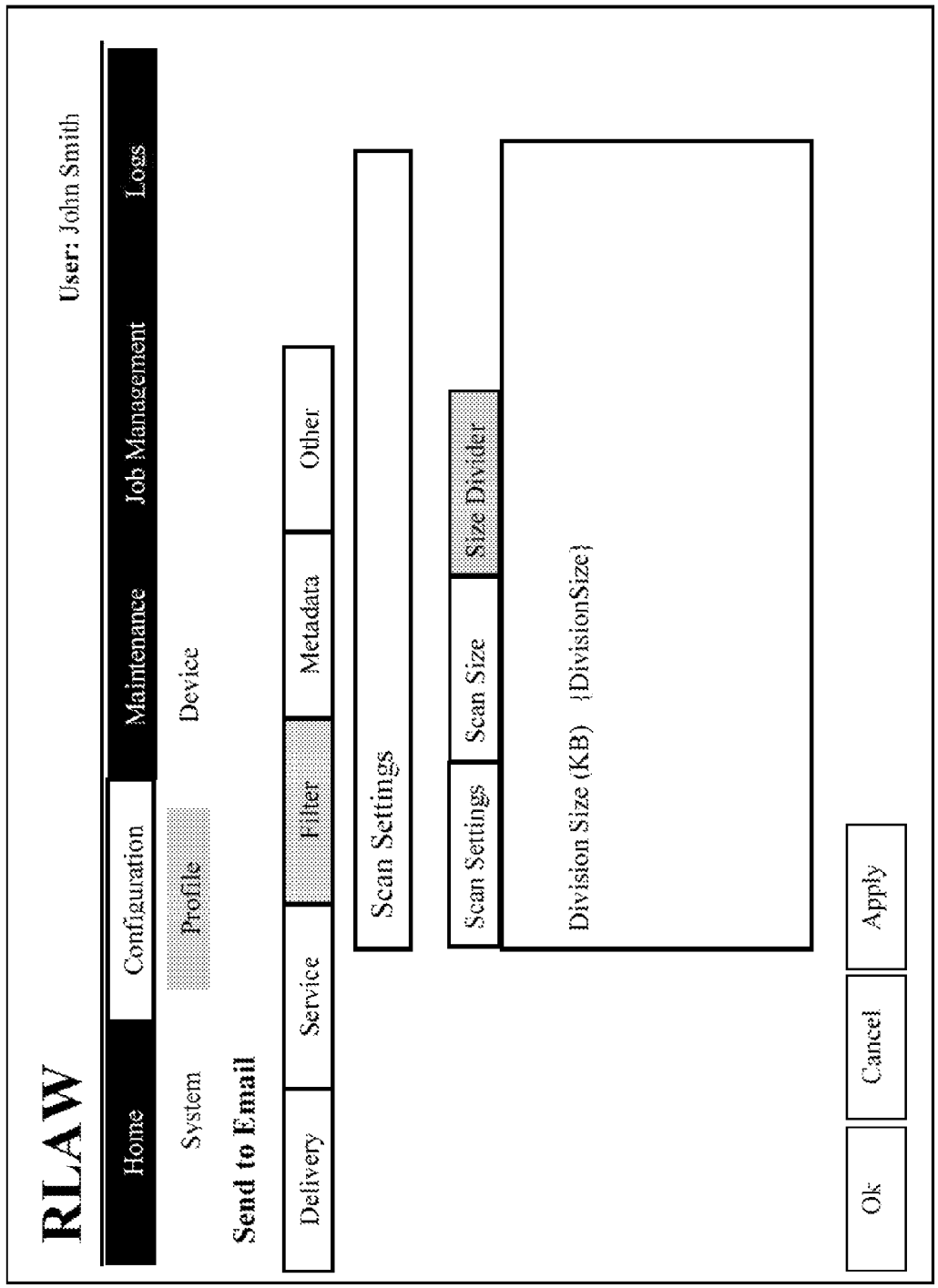
Figure 7E:
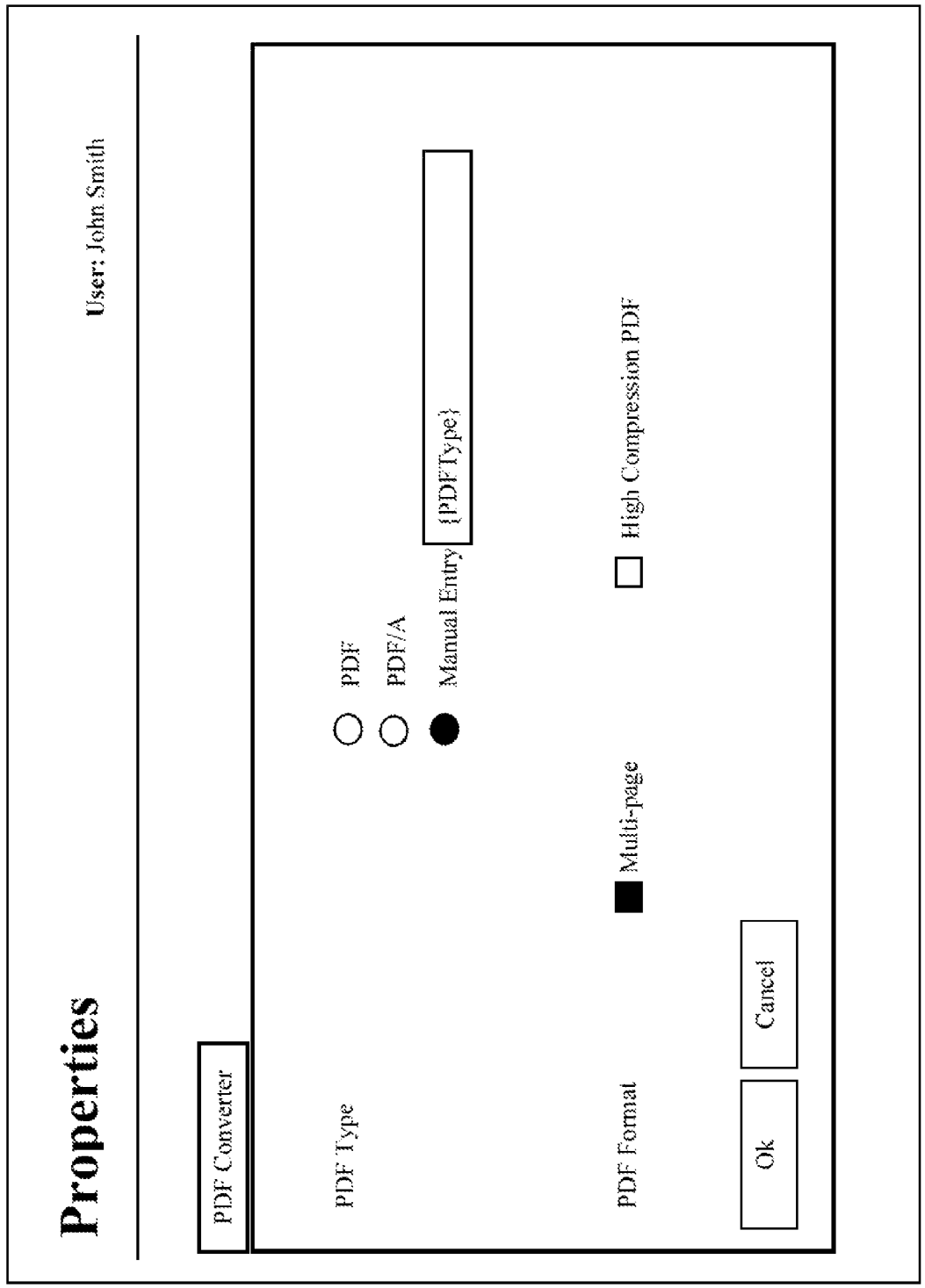

If the "Manual Entry" radio button is selected, as shown in FIG. 7E, the user may enter the file type or a metadata field may be used. A PDF converter filter can be used to convert the scanned image into a PDF file, and the supported image formats that can be passed to such filter include at least TIFF, TIFF-F, DCX, BMP, JPEG, PNG, and GIF. Further, a file size limitation for a particular court may be looked up and saved to a 'PDFType' metadata field, as shown in FIG. 7E. In order to properly perform the size division, the document may be a multi-page PDF. For a single page PDF, each page is already at the smallest unit of data and therefore may not be able to be further divided.

Figure 2A:
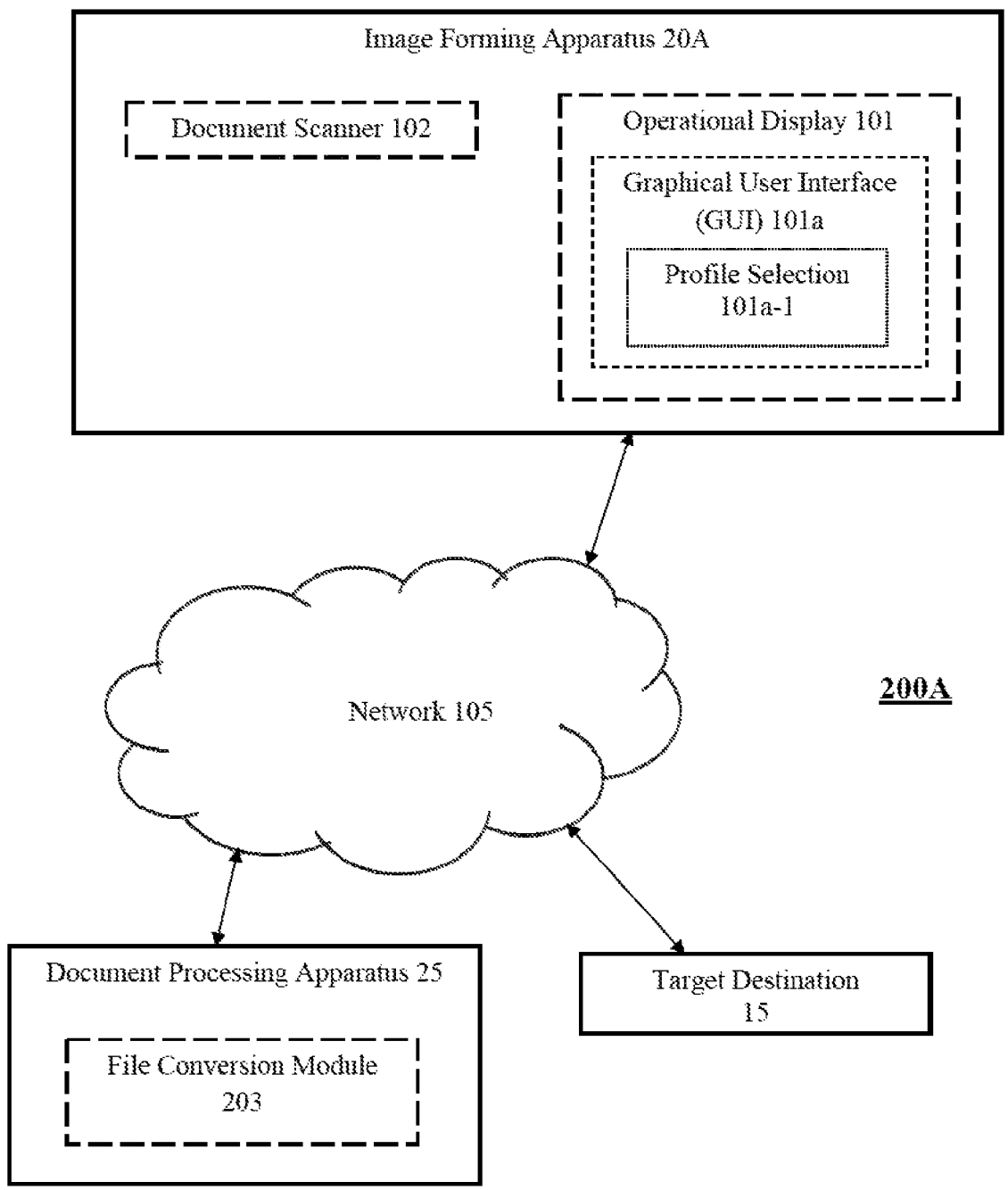
FIG. 2A shows a block diagram of a document processing system, according to another exemplary embodiment.
Figure 2B:
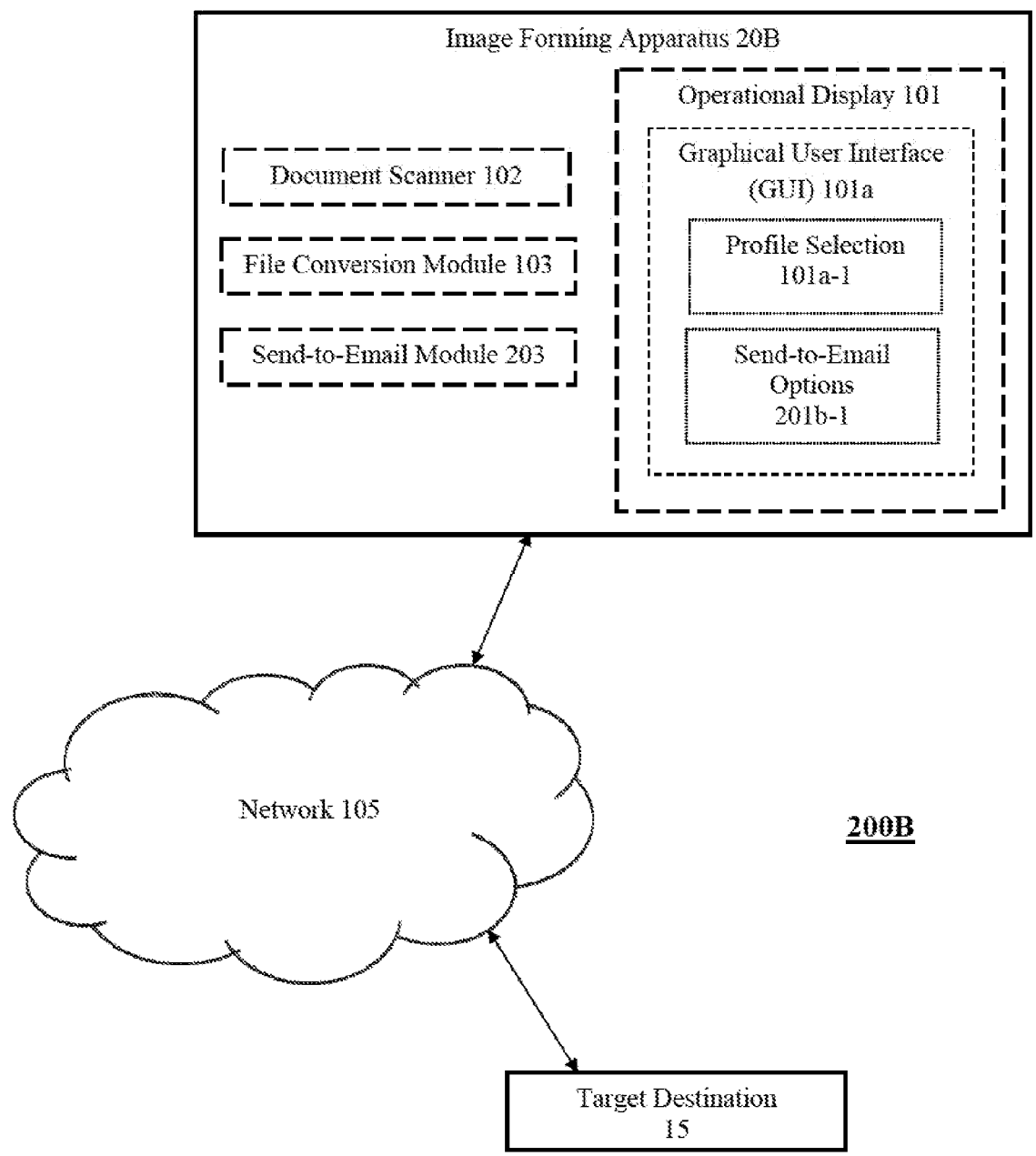
FIG. 2B shows a block diagram of a document processing system, according to another exemplary embodiment.
Figure 2C:
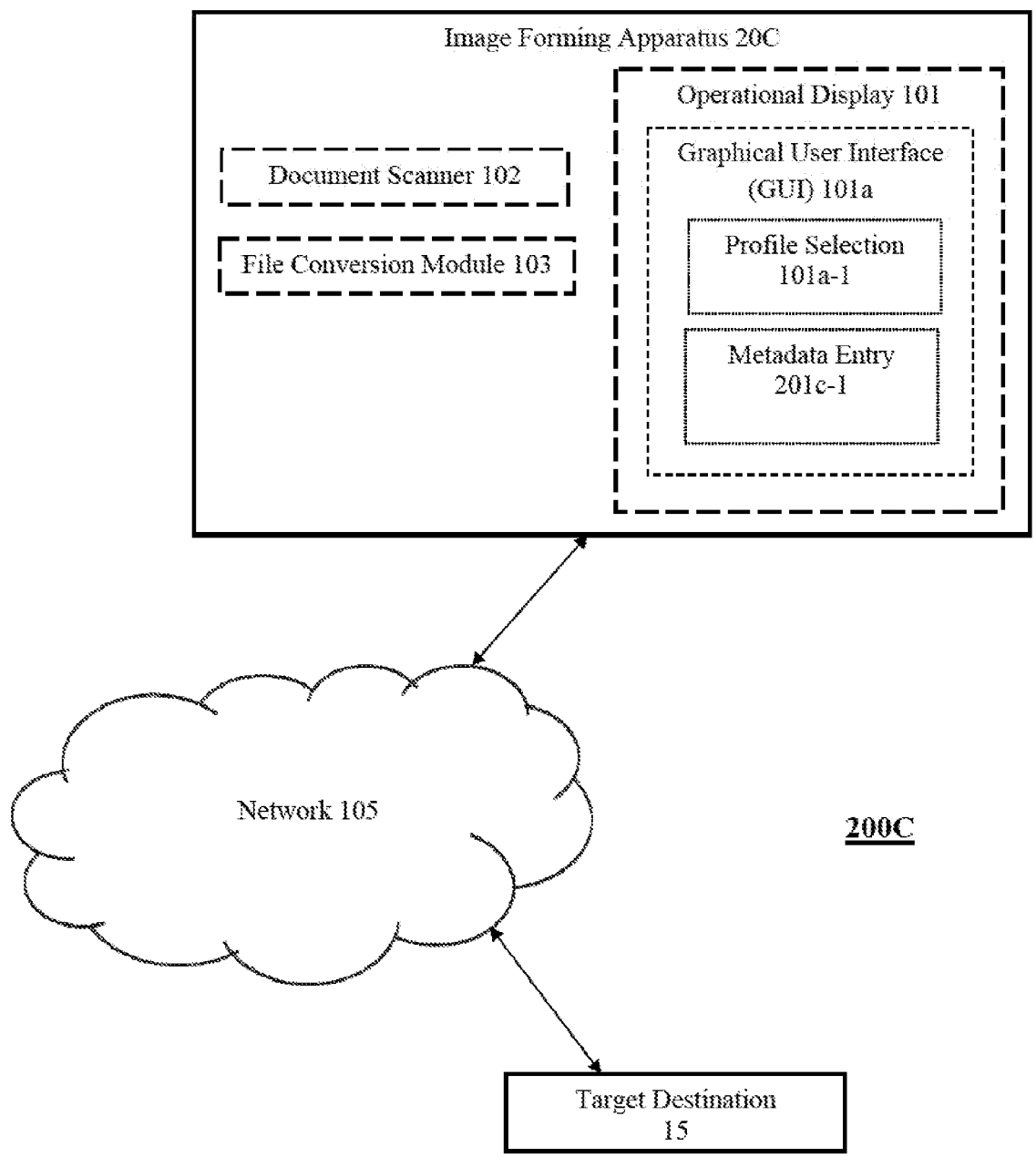
FIG. 2C shows a block diagram of a document processing system, according to another exemplary embodiment.

As the skilled artisan may appreciate, although the file conversion module 103 is shown in FIGS. 1, 2B and 2C as part of the image forming apparatus, the file conversion functionality can be performed by another device (such as document processing apparatus 25 shown in FIG. 2A). The file conversion functionality can be performed by any computing device, such as discussed infra with reference to FIG. 3 (including but not limited to a workstation, notebook or tablet computer, or another information terminal, etc., that can communicate with other devices through the network 105), through appropriate programming of the device.

The target destination 15 can be any computer or storage device, such as an e-mail server, a document management server, a file server, a workstation, another computing device, networked storage connected through the network 105, another storage device, etc. In addition, as the skilled artisan may appreciate, although the target destination 15 is shown in FIGS. 1, 2A, 2B and 2C as a distinct device, it may alternatively be integral to the image forming apparatus (and later transferred via user or computer action, as needed and/or specified).

The network 105 can be a local area network, a wide area network or any type of network such as an intranet, an extranet (for example, to provide controlled access to external users, for example through the Internet), a private or public cloud network, the Internet, etc., or a combination thereof. In addition, the network 105 preferably uses TCP/IP (Transmission Control Protocol/Internet Protocol), but other protocols such as SNMP (Simple Network Management Protocol) and HTTP (Hypertext Transfer Protocol) can also be used. How devices can connect to and communicate over networks is well known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

FIG. 2A shows schematically a system 200A including image forming apparatus 20A, according to another exemplary embodiment. The system 200A is similar to the system 100 of FIG. 1 except that whereas the file conversion module 103 in FIGS. 1, 2B and 2C is part of the image forming apparatus, file conversion module 203, as shown in FIG. 2A, is NOT disposed on the image forming apparatus 20A, and instead is disposed on host document processing apparatus 25 which can be any computing device, such as discussed infra with reference to FIG. 3, through appropriate programming of the device.

In the example shown in FIG. 2A, the scanned document images (output by the document scanner 102) are transmitted by the image forming apparatus 20A via the network 105 to the document processing apparatus 25 and processed by the file conversion module 203 in a manner similar to that by the file conversion module 103 in FIGS. 1, 2B and 2C.

FIG. 2B shows schematically a system 200B, according to another exemplary embodiment. The system 200B is similar to the system 100 of FIG. 1 except that image forming apparatus 20A additionally includes send-to-email options GUI portion 201*b*-1 and send-to-email module 203. The send-to-email options GUI portion 201*b*-1 may allow for user selection of email division options and such options may include an email divide option to limit an e-mail sent by the send-to-email module to a size that is no greater than the specified email division size, as shown in FIG. 7G. When the email size divide option is selected and a sum of the file sizes of the grouping of the divided image files associated with the hardcopy document exceeds the email division size, the send-to-email module may divide the grouping of the divided image files associated with the hardcopy document into multiple subgroups of the divided image files. The send-to-email options GUI portion then may send multiple emails with the respective subgroups as attachments thereto. Thus, the email size divide option may control the total size of all attachments in an email, and the system of FIG. 1 may control the maximum size of each attached file after the division.

FIG. 2C shows schematically a system 200C, according to another exemplary embodiment. The system 200C is similar to the system 100 of FIG. 1 except that image forming apparatus 20C additionally includes metadata entry GUI portion 201*c*-1 for user entry of metadata for the hardcopy document. In system 200C, the file conversion module 103 may generate file names in which, for each file amongst the divided image files associated with the hardcopy document, the file name for the file may include (i) a shared name portion associated with the hardcopy document constituted by specified metadata and associated with the hardcopy document, and (ii) a suffix portion unique to the file and appended to the shared name portion. Thus, each of the divided image files may be more easily identified at the specified scan image target.

Figure 3:
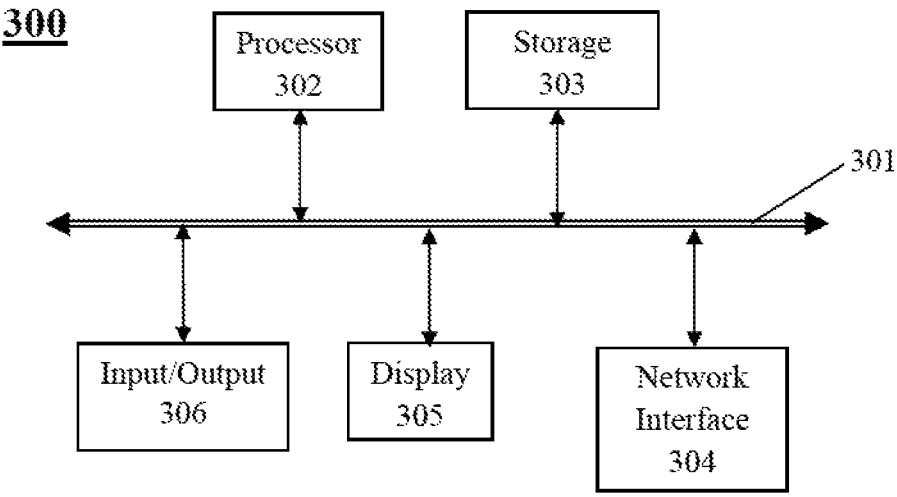
FIG. 3 shows a block diagram of an exemplary configuration of a computing device that can constitute a target destination (e.g., in any of the systems shown in FIGS. 1, 2A, 2B and 2C) and/or can be configured so as to operate as a document processing apparatus (e.g., such as shown in FIG. 2A)

FIG. 3 shows an exemplary constitution of a computing device that can constitute the target destination 15 (e.g., in any of the systems shown in FIGS. 1, 2A, 2B and 2C) and/or can be configured so as to operate as the document processing apparatus 25 (FIG. 2A).

In FIG. 3, apparatus 300 includes a processor (or central processing unit) 302 that communicates with a number of other components, including memory or storage part 303, network interface 304, display 305 and other input/output (e.g., keyboard, mouse, etc.) 306, by way of a system bus 301. The apparatus 300 may be a special-purpose device (such as including one or more application specific integrated circuits or an appropriate network of conventional component circuits) or it may be software-configured on a conventional server computer, computer workstation or personal computer with sufficient memory, processing and communication capabilities to operate as a server, as should be appreciated to those skilled in the relevant arts.

In the apparatus 300, the processor 302 executes program code instructions that control device operations. The processor 302, memory/storage 303, network interface 304, display 305 and input/output 306 are conventional, and therefore in order to avoid obfuscating the inventive aspects of this disclosure, such conventional aspects are not discussed in detail herein.

The apparatus 300 includes the network interface 304 for communications through a network, such as communications through the network 105 with file conversion module and other devices in FIG. 1 and FIGS. 2A-2C. However, it should be appreciated that the subject matter of this disclosure is not limited to such configuration. For example, the apparatus 300 may communicate with client terminals through direct connections and/or through a network to which some components are not connected. As another example, the apparatus 300 does not need to be provided by a server that services terminals, but rather may communicate with the devices on a peer basis, or in another fashion.

The apparatus 300 of the present disclosure is not limited to a server or computer, but can be manifested in any of various devices that can be configured to communicate over a network and/or the Internet.

Figure 4:
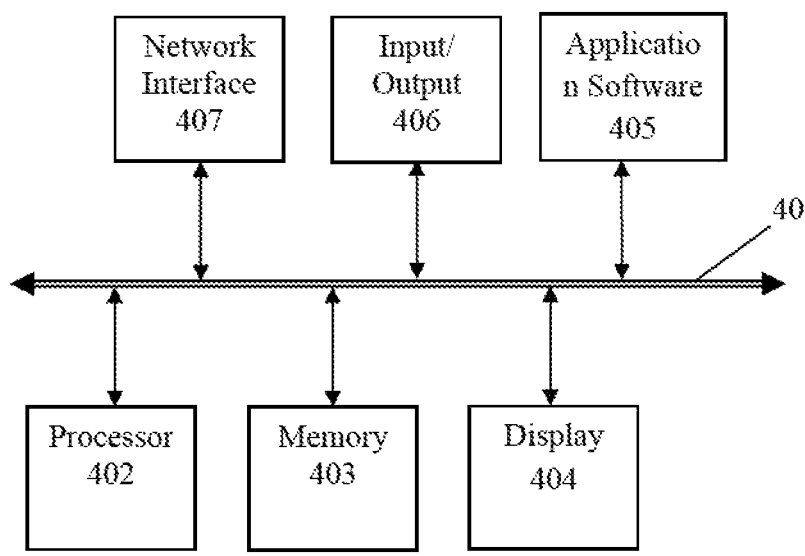
FIG. 4 shows a block diagram of an exemplary configuration of a computer that can be configured via device administration software to permit an administrator to generate and upload a document processing profile.

An exemplary constitution of a terminal configured by application software to permit an administrator to administer to any of various devices connected to network 105, such as, for example, create document processing profiles to be uploaded to the image forming apparatuses shown in FIG. 1 and FIGS. 2A-2C, is shown schematically as 40 in FIG. 4. In FIG. 4, apparatus 400 includes a processor (or central processing unit) 402 that communicates with a number of other components, including memory 403, display 404, application software 405, input/output (such as keyboard, mouse, touchpad, stylus, microphone and/or speaker with voice/speech interface and/or recognition software, etc.) 406, network interface 407, by way of an internal bus 401.

The memory 403 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 407 provides a connection (for example, by way of an Ethernet connection or other network connection which supports any desired network protocol such as, but not limited to TCP/IP, IPX, IPX/SPX, NetBEUI, etc.) to the network to which the computer 400 is connected (e.g., network 105 of FIG. 1 and FIGS. 2A-2C).

Additional aspects or components of the computer 400 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

FIG. 5 shows a schematic diagram of a configuration of an MFP (multi-function printer or multi-function peripheral), which can be any apparatus that includes a document scanner and has provisions (such as, for example, via a microprocessor chip or a collection of devices having varying degrees of integration) to perform one or more functionalities in addition to scanning a hardcopy document. The MFP 500 shown in FIG. 5 includes a controller 502, and various elements connected to the controller 502 by an internal bus 501. The controller 502 controls and monitors operations of the MFP 500. The elements connected to the controller 502 include storage 503 (for example, random access memory, read-only memory, hard disk drive, portable storage media drive such as for optical discs, magnetic discs, magneto optical discs, etc., semiconductor memory cards, combinations of storage media, etc.), scanning 504, printing 505, a converter 506, a network interface (I/F) 507, and a user interface 508.

Storage 503 can include one or more storage parts or devices [e.g., a read only memory (for example, ROM, PROM, EPROM, EEPROM, etc.), a random access memory (RAM), a hard disk drive (HDD), portable media (for example, floppy disk, optical disc, magnetic discs, magneto-optical discs, semiconductor memory cards, etc.) drives], and program code instructions can be stored in one or more parts or devices of storage 503 and executed by the controller 502 to carry out the instructions. Such instructions can include instructions for performing specified functions (such as printing, scanning, faxing, copying, e-mailing, etc.) of the MFP 500, to enable the MFP 500 to interact with a terminal, as well as perhaps other external devices, through the network interface 507, and interactions with users through the user interface 508.

The network interface 507 is utilized by the MFP 500 to communicate with other network-connected devices such as a terminal, a server and receive data requests, print jobs, user interfaces, and etc.

The user interface 508 includes one or more electronic visual displays that display, under control of controller 502, information allowing the user of the MFP 500 to interact with the MFP 500. The electronic visual display can be any of various conventional displays (such as a liquid crystal display, a plasma display device, a cathode ray tube display, etc.), but preferably is equipped with a touch sensitive display (for example, liquid crystal display) and is configured to provide a GUI (graphical user interface) based on information input by an operator of the MFP 500, so as to allow the operator to interact conveniently with services provided on the MFP 500, or with the MFP 500 serving as terminal for accessing electronic data or other content through the network. User interfaces or other contents received through the network via the network interface 507 can be displayed on the display screen.

The display screen does not need to be integral with, or embedded in, a housing of the MFD 500, but may simply be coupled to the MFD 500 by either a wire or a wireless connection. The user I/O 508 may include keys and/or buttons (such as graphical keys or buttons, or other graphical elements, of a GUI on a touchscreen display 508) for inputting information or requesting various operations. Alternatively, the user I/O 508 and the display screen may be operated by a keyboard, a mouse, a remote control, voice recognition, or eye-5 movement tracking, or a combination thereof.

Since the MFD 500 is typically shared by a number of users, and is typically stationed in a common area, the MFD 500 preferably prompts the user to supply login credentials or authentication information, such as user name (or other user or group information), password, access code, etc. The user credentials may also be stored for the session and automatically supplied if access to other devices through the network requires it. On the other hand, such other devices may prompt the user to supply other user credentials through the user interface.

Other methods of authentication may also be used. For example, the MFD 500 may be equipped with a card reader or one or more biometrics means (such as comparing fingerprints, palm prints, voice or speech, retinas or irises, facial expressions or features, signature, etc.). The MFD 500 may communicate the user credentials, provided in the manners discussed above, to other devices or applications connected to the MFD 500 via a network (e.g., the network 105 of FIGS. 1 and 2A-2C) for determining authorization for performing jobs.

Scanning 504, printing 505, and network interface 507 are otherwise conventional, and therefore, a detailed description of such conventional aspects is omitted in the interest of clarity and brevity. The MFP 500 can have any or all of the functions of similar devices conventionally known, such as for scanning, editing and storing images, sending a fax, sending and receiving e-mails with or without attachments, accessing files by FTP or another protocol or facility, surfing the Web, scan-to-folder, scan-to-email, etc. Further, multi-functional devices or multi-function peripheral devices can play a prominent role to convert hardcopy documents to electronic documents.

Figure 6:
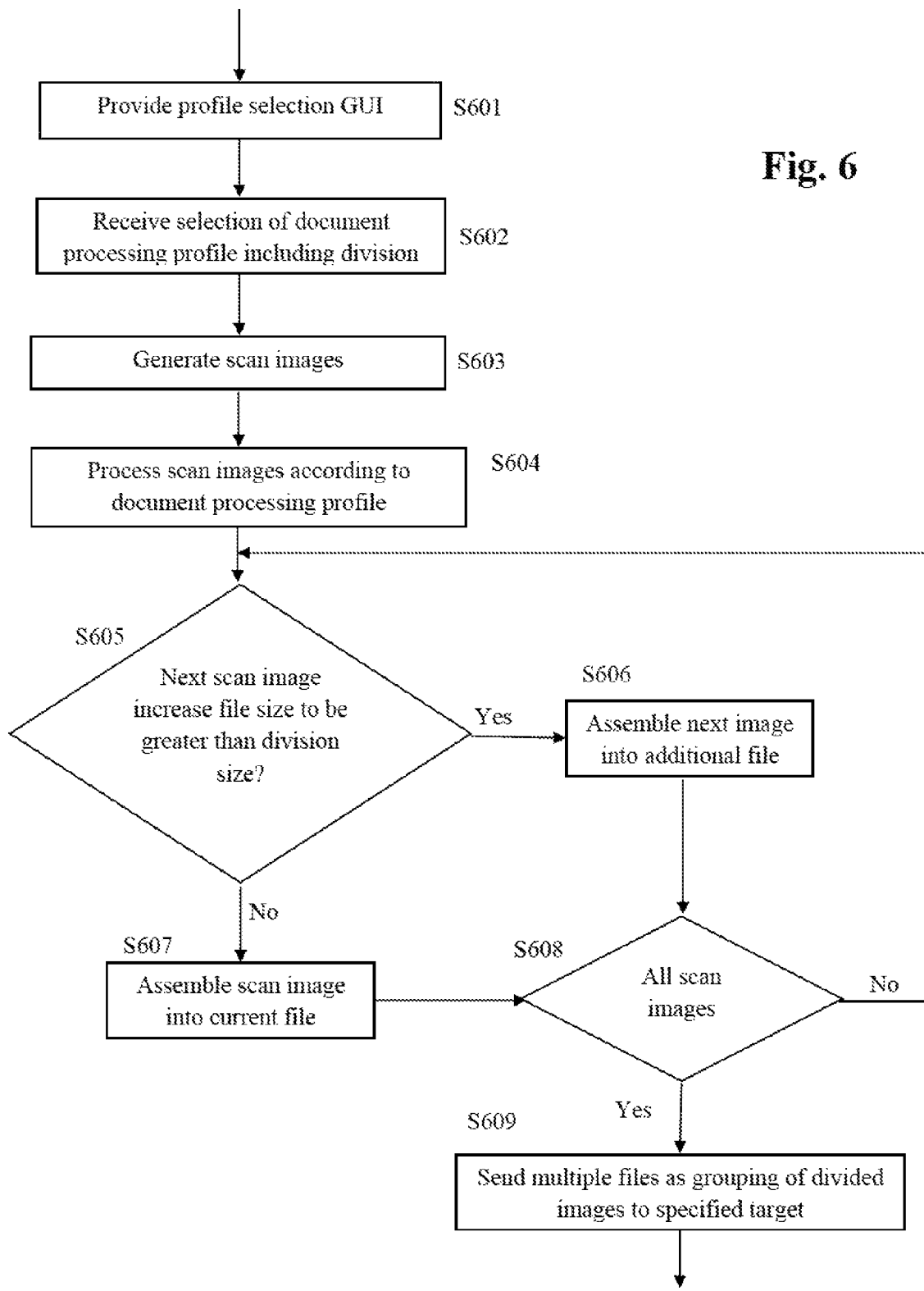
FIG. 6 shows a flow chart of a method that can be performed in any of the systems shown in FIGS. 1, 2A, 2B and 2C.

FIG. 6 shows a method or process performed by a multi-function document processing system including an operational display (e.g., 101), a document scanner (e.g., 102), and a file conversion module (e.g., 103), according to an exemplary embodiment.

In an example of a process discussed below with reference to FIGS. 7A-7H, a user may utilize the multi-function document processing system via a graphical user interface (GUI) (e.g., operational display 101) and a scanner (e.g., document scanner 102) to process a scan document image according to a selected document processing profile (e.g., FIG. 1). Such system allows scanned document images to be divided, and each image file may have a file size no greater than a pre-configured division size specified by the selected document processing profile.

For example, many legal courts now require electronic filing, although the file type and file size limits for documents vary from court to court. A user of a MFP in a conventional system may need to constantly look up such limitations each time a document needs to be filed in a particular court, thereby making it inconvenient for the user who must constantly perform such research, especially as a deadline for filing approaches. On the other hand, by creating a system that has plural document processing profiles corresponding to particular file type and file sizes, the user may not need to constantly perform such research. In other words, by having the pre-configured division sizes specified by the document processing profiles, the user can avoid time-consuming research regarding file type and file size limitations that vary from court to court.

To select a document processing profile, the user of the operational display 101 may first log into the system through a user interface, such as shown in FIG. 7A, by inputting user credentials which may include a username and password. After authenticating the user credentials, the operational display presents the user with a graphical user interface (GUI) screen, such as shown in FIG. 7B. Here, the user may choose to select a particular document processing profile.

When the user selects the "Select Profile" option in the graphical user interface (GUI), the display presents to the user a profile selection GUI portion (step S601), such as shown in FIG. 7C. Such profile selection GUI portion may, for example, allow the user to choose between the "US District Court, Northern District of West Virginia" profile, the "US District Court, Southern District of West Virginia" profile, and the "US District Court, Southern District of New York" profile. However, it should be noted this is exemplary and many different profiles can be in the system. Even for the profiles that may not be in the system, a look-up function may be utilized for both the file size and file type limitations, or the user may proceed with default values, or the user may manually enter such limitations.

The operational display then receives a selection of a particular document processing profile which corresponds to a specified division size (step S602). In this case, since the user has selected the document processing profile of "US District Court, Northern District of West Virginia", the document scanner 102 generates scanned images of the hardcopy document and submits the scan document images for further processing according to this selected document processing profile (step S603). The file conversion module then processes the scan document images according to the selected document processing profile (step S604), which includes assembling the scan document images into divided image files. Each of the divided image files has a size that is not greater than the pre-configured division size specified by the selected document processing profile. As shown in FIG. 7D, the division size may be looked up for a particular court and saved to the metadata field {divisionsize}, or a number can be manually entered to specify the size of each file to divide the scanned data into.

Figure 7F:
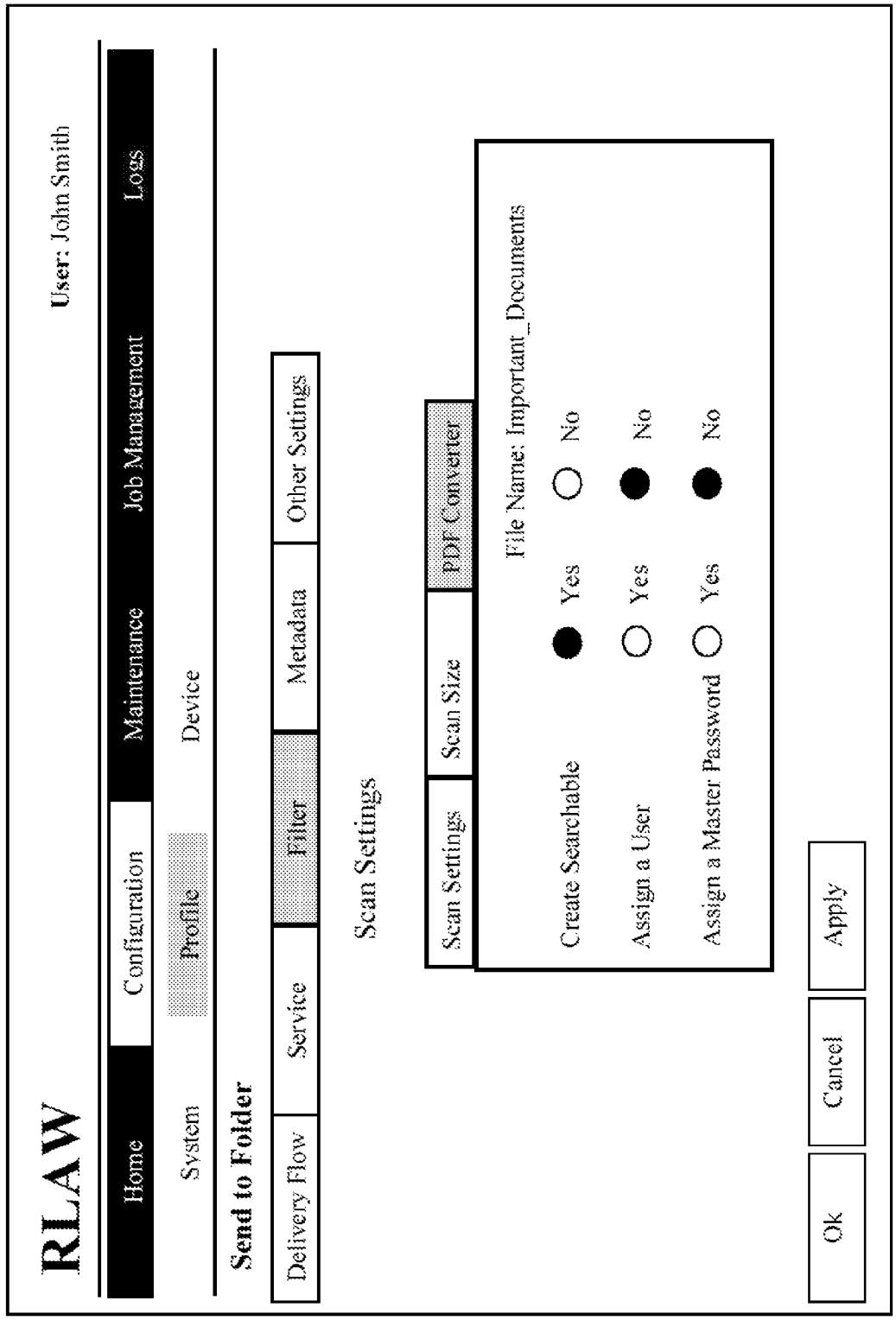

As shown in FIG. 7E, a file type for the document processing profile may be selected as, for example, a PDF file or a PDF/A file. If the "Manual Entry" option is selected, the metadata field may be utilized such that a file type can be looked up for a particular court and saved to the metadata field. In a case where the multi-page PDF option is selected, a multi-page PDF will be created, and if it is not selected, the image will be converted into a single page PDF, in which case the scan image document may not be divided. An administrator may create the PDF files as searchable PDF files and assign passwords to the PDF files, as shown in FIG. 7F. A high compression PDF option is also available for the scan image document.

In an exemplary embodiment, in assembling the scan document images into divided image files based on specified division size, the multi-function document processing system determines if a next scan document image, if assembled, would increase the file size of the image to be greater than the division size specified in the document processing profile (step S605). In the case that the next image would increase the file size of the image to be greater than the specified division size (step S605, yes), the next image is instead assembled into another image file (step s606). On the other hand, if the next scan document image would not increase the file size of the image file to be greater than the specified division size (step S605, no), the next scan image is assembled into the current image file (step S607).

When processing of all scan images is complete (step S608, yes), the multi-function document processing system may send multiple divided image files as a grouping of divided image files to a specified scan image target (step S609). However, if the processing of all scan images is not yet complete (step S608, no), the document processing of the scan image continues.

The specified scan image target may be an e-mail address, as shown in the scan-to-email functionality of FIGS. 7D and 7G. In the example shown in FIG. 7G, if the "Do Not Divide" option is chosen from the drop down menu, all scanned data may be sent in one e-mail. On the other hand, if the "Page Divide" Option were to be selected from the drop down menu, each page of the scanned data may be sent as multiple e-mails. Alternatively, if the "Size Divide" option is chosen from the drop down list, the scanned data is divided into parts so that each part does not exceed the size specified in the document processing profile and sends the scanned data as multiple e-mails. In other words, when the "Divide Email" option is selected and a sum of the file sizes of the grouping of the divided image files associated with the hardcopy document exceeds the email division size specified, the grouping of divided image files associated with the hardcopy document may be divided into multiple subgroups of divided image files with each subgroup below the file size threshold, as shown in FIG. 7H. Then, multiple entails with the respective subgroups attached thereto may be sent out.

The "Email Division Size (KB)" item in FIG. 7B allows the user to enter the size to split the documents into when dividing the scanned image into multiple images when the "Size Divide" option is selected from the "Divide Email" drop down menu. The specified image target may also be a particular destination folder, as shown in the example of FIG. 7F where "Send to Folder" is displayed such that a scan-to-store functionality is utilized. Alternatively, the specified image target may be a particular server, which may be utilized as a central repository.

In another exemplary embodiment, a metadata entry GUI portion may be provided in the operational display, thereby allowing for user entry of metadata for a hardcopy document. When the file conversion module generates file names for each file amongst the divided image files associated with the hardcopy document, the metadata may be utilized in the file name itself. Such file name may include (i) a shared name portion constituted by the specific metadata entered and associated with the hardcopy document, and (ii) a suffix portion unique to the file and appended to the shared name portion. For example, for the file "Important_Documents" entered in FIG. 7F, the output file names generated may be "Important_Documents_01.pdf", "ImportantDocuments_02".pdf, "Important_Documents_03.pdf", etc., where "01", "02", and "03" are each a suffix portion unique to the file appended to the shared name portion.

In an exemplary embodiment, a summary screen for the Send to Email function is shown in FIG. 7H. In this example, "Size Divide" has been selected from the "Divide Email" drop down menu, an "Email Division Size" of 100 KB has been specified, and a "Division Size" of 50 KB has been specified. The email division size of 100 KB may control the total size of the attachments in each email while the division size of 50 KB may control the maximum size of each file after the division. In this example, the "Image Input" box represents the scanned images of the hardcopy documents, and the "Email Output" box represents the scanned images that are sent as PDF files via e-mail after document processing occurs. The first scanned image, "Image1.TIFF" with a size of 32 KB, is grouped with "Image2.TIFF" with a size of 5 KB and "Image3.TIFF" with a size of 8 KB to form the first attached file of "Email 1", a total of 45 KB amongst the grouping. Thus, the first attached file of "Email 1" is below the 50 KB maximum size as specified by the division size. Since "Image4.TIFF" with a size of 40 KB is added as a second attached file to "Email 1", the sum of the sizes of the attachments in "Email 1" is 85 KB, which is below the 100 KB maximum size as specified by the email division size, and the second attached file of "Email 1", with a size of 40 KB, remains under the 50 KB maximum specified by the division size. Since only "Image5.TIFF" with a size of 38 KB remains of the scanned images input to the system. "Image5.TIFF" is sent as an attachment in a second email, "Email2". "Image5.TIFF" is not added as an additional attachment to "Email1" of FIG. 7H as this would increase the total size of attachments in "Email 1" to 123 KB, which would exceed the specified maximum email division size of 100 KB. Since the size of "Image5.TIFF" is under 50 KB, it is within the division size limitation and thus may be sent as an attached file.

The aforementioned specific embodiments are illustrative, and many variations can be introduced on these embodiments without departing from the spirit of the disclosure or from the scope of the appended claims. For example, various aspects, features and advantages disclosed herein can applied to facilitate document processing, such as, for example, to meet file size and file type requirements, with or without the user knowing such requirements. Further, although the aspects, features and advantages are discussed herein in connection with a document processing system, it should be understood that such aspects and feature may be integrated in a standalone device, with or without network connection capability.

In addition, elements and/or features of different examples and illustrative embodiments may be combined with each other and/or substituted for each other within the scope of this disclosure and appended claims.

What is claimed is:

1. A multi-function image forming apparatus comprising:
an operational display to provide a graphical user interface (GUI) including a profile selection GUI portion that provides, for user selection, plural registered document processing profiles corresponding to respective specific scan image targets, each registered document processing profile indicating a specific pre-configured division size corresponding to a maximum file size limitation permitted by a respective specific scan image target;
a document scanner to scan a hardcopy document and generate one or more scan document images, and submit the scan document images for further processing according to a selected document processing profile corresponding to a specified scan image target; and
a file conversion module embodied in a non-transitory storage medium and executable by a processor to process the scan document images according to the selected document processing profile,
wherein the file conversion module processes the scan document images in accordance with the specific pre-configured division size indicated in the selected document processing profile amongst the plural registered document processing profiles, and based on the selected document processing profile, assembles the scan document images sequentially into divided image files each having a file size no greater than the specific pre-configured division size specified by the document processing profile corresponding to the specified scan image target, and sends, to the specified scan image target corresponding to the selected document processing profile, the multiple divided image files as a grouping of the divided image files associated with the hardcopy document and assembled based on the document processing profile corresponding to the specified scan image target to ensure that the divided image files comport with file size requirements of the specified scan image target.

2. The multi-function image forming apparatus as claimed in claim 1, wherein
the file conversion module assembles the scan document images one-by-one into an image file, and determines that when a next scan document image, not yet assembled into the image file, would, if assembled into the image file, increase the file size of the image file to be greater than the pre-configured division size, the next scan document image is assembled into another image file.

3. The multi-function image forming apparatus as claimed in claim 1, further comprising:
a send-to-email module to send a scan output file to a specified e-mail address,
wherein the operational display provides a send-to-email options GUI portion for user selection of email division options, the selectable email division options including an email size divide option to limit an e-mail sent by the send-to-email module to no greater than an email division size, and
when the email size divide option is selected and a sum of the file sizes of the grouping of the divided image files associated with the hardcopy document exceeds the email division size, the send-to-email module divides the grouping of the divided image files associated with the hardcopy document into multiple subgroups of the divided image files and sends multiple emails with the respective subgroups as attachments thereto.

4. The multi-function image forming apparatus as claimed in claim 1,
wherein the plural document processing profiles correspond to respective venues, and each document processing profile indicates a division size corresponding to a maximum file size limitation of the venue corresponding to the document processing profile.

5. The multi-function image forming apparatus as claimed in claim 1, wherein
the operational display provides a metadata entry GUI portion for user entry of metadata for the hardcopy document, and
the file conversion module generates file names in which, for each file amongst the divided image files associated with the hardcopy document, the file name for the file includes (i) a shared name portion associated with the hardcopy document constituted by specified metadata and associated with the hardcopy document, and (ii) a suffix portion unique to the file and appended to the shared name portion.

6. The multi-function image forming apparatus as claimed in claim 1,
wherein the file conversion module assembles each of the divided image files to a file type specified by the selected document processing profile.

7. A document processing system comprising:
a multi-function image forming apparatus including:
an operational display to provide a graphical user interface (GUI) including a profile selection GUI portion that provides, for user selection, plural registered document processing profiles corresponding to respective specific scan image targets, each registered document processing profile indicating a specific pre-configured division size corresponding to a maximum file size limitation permitted by a respective specific scan image target; and
a document scanner to scan a hardcopy document and generate one or more scan document images, and submit the scan document images for further processing according to a selected document processing profile corresponding to a specified scan image target; and
a document processing apparatus configured to receive the selected document processing profile and the scan document images from the multi-function image forming apparatus, the document processing apparatus including a file conversion module embodied in a non-transitory storage medium and executable by a processor to process the scan document images according to the selected document processing profile,
wherein the file conversion module processes the scan document images in accordance with the specific pre-configured division size indicated in the selected document processing profile amongst the plural registered document processing profiles, and based on the selected document processing profile, assembles the scan document images sequentially into divided image files each having a file size no greater than the specific pre-configured division size specified by the document processing profile corresponding to the specified scan image target, and sends, to the specified scan image target corresponding to the selected document processing profile, the multiple divided image files as a grouping of the divided image files associated with the hardcopy document and assembled based on the document processing profile corresponding to the specified scan image target to ensure that the divided image files comport with file size requirements of the specified scan image target.

8. The document processing system as claimed in claim 7, wherein
the file conversion module assembles the scan document images one-by-one into an image file, and determines that when a next scan document image, not yet assembled into the image file, would, if assembled into the image file, increase the file size of the image file to be greater than the pre-configured division size, the next scan document image is assembled into another image file.

9. The document processing system as claimed in claim 7,
wherein the document processing apparatus further comprises a send-to-email module to send a scan output file to a specified e-mail address,
wherein the send-to-email module limits an e-mail sent by the send-to-email module to no greater than an email division size, and when a sum of the file sizes of the grouping of the divided image files associated with the hardcopy document exceeds the email division size, the send-to-email module divides the grouping of the divided image files associated with the hardcopy document into multiple subgroups of the divided image files and sends multiple emails with the respective subgroups as attachments thereto.

10. The document processing system as claimed in claim 7,
wherein the plural document processing profiles correspond to respective venues, and each document processing profile indicates a division size corresponding to a maximum file size limitation of the venue corresponding to the document processing profile.

11. The document processing system as claimed in claim 7, wherein
wherein the file conversion module assembles each of the divided image files to a file type specified by the selected document processing profile.

12. A method performed in a multi-function document processing system including an operational display and a document scanner, the method comprising:
(a) providing on the operational display a graphical user interface (GUI) including a profile selection GUI portion that provides, for user selection, plural registered document processing profiles corresponding to respective specific scan image targets, each registered document processing profile indicating a specific pre-configured division size corresponding to a maximum file size limitation permitted by a respective specific scan image target;

(b) generating one or more scan document images obtained by scanning a hardcopy document, by the document scanner;

(c) processing the scan document images in accordance with the specific pre-configured division size indicated in the selected document processing profile amongst the plural registered document processing profiles, and based on the selected document processing profile, assembling the scan document images sequentially into divided image files each having a file size no greater than the specific pre-configured division size specified by the selected document processing profile corresponding to the specified scan image target; and (d) sending, to the specified scan image target corresponding to the selected document processing profile, the multiple divided image files as a grouping of the divided image files associated with the hardcopy document and assembled based on the document processing profile corresponding to the specified scan image target to ensure that the divided image files comport with file size requirements of the specified scan image target.

13. The method as claimed in claim 12, wherein
the processing in (c) includes assembling the scan document images one-by-one into an image file, and when a next scan document image, not yet assembled into the image file, would, if assembled into the image file, increase the file size of the image file to be greater than the pre-configured division size, assembling the next scan document image into another image file.

14. The method as claimed in claim 12, further comprising:
providing send-to-email functionality to send a scan output file to a specified e-mail address; and
providing a send-to-email options GUI portion on the operational display, for user selection of email division options, the selectable email division options including an email size divide option to limit an e-mail sent by the send-to-email functionality to no greater than an email division size,
wherein when the email size divide option is selected and a sum of the file sizes of the grouping of the divided image files associated with the hardcopy document exceeds the email division size, the send-to-email module divides the grouping of the divided image files associated with the hardcopy document into multiple subgroups of the divided image files and sends multiple emails with the respective subgroups as attachments thereto.

15. The method as claimed in claim 12, wherein the plural document processing profiles correspond to respective venues, and each document processing profile indicates a division size corresponding to a maximum file size limitation of the venue corresponding to the document processing profile.

16. The method as claimed in claim 12, further comprising:
providing a metadata entry GUI portion on the operational display for user entry of metadata for the hardcopy document; and
generating file names in which, for each file amongst the divided image files associated with the hardcopy document, the file name for the file includes (i) a shared name portion associated with the hardcopy document constituted by specified metadata and associated with the hardcopy document, and (ii) a suffix portion unique to the file and appended to the shared name portion.

17. The method as claimed in claim 12, wherein each of the divided image files assembled in (c) has a file type specified by the selected document processing profile.

* * * * *